(12) United States Patent
Jo et al.

(10) Patent No.: US 8,571,404 B2
(45) Date of Patent: Oct. 29, 2013

(54) DIGITAL PHOTOGRAPHING APPARATUS, METHOD OF CONTROLLING THE SAME, AND A COMPUTER-READABLE MEDIUM STORING PROGRAM TO EXECUTE THE METHOD

(75) Inventors: Hyeon-cheol Jo, Daegu (KR); Jae-myung Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 58 days.

(21) Appl. No.: 13/012,993

(22) Filed: Jan. 25, 2011

(65) Prior Publication Data
US 2011/0188844 A1   Aug. 4, 2011

(30) Foreign Application Priority Data

Feb. 4, 2010   (KR) .......................... 10-2010-0010499

(51) Int. Cl.
*G03B 13/00*   (2006.01)

(52) U.S. Cl.
USPC ........................................................ 396/125

(58) Field of Classification Search
USPC ........................................................ 396/125
See application file for complete search history.

(56) References Cited

U.S. PATENT DOCUMENTS

| | | | |
|---|---|---|---|
| 2005/0275742 A1* | 12/2005 | Baron | 348/345 |
| 2008/0317285 A1* | 12/2008 | Abe | 382/103 |
| 2008/0317455 A1* | 12/2008 | Abe | 396/263 |
| 2009/0116830 A1* | 5/2009 | Kumagai | 396/125 |
| 2009/0135269 A1* | 5/2009 | Nozaki et al. | 348/222.1 |
| 2010/0194958 A1* | 8/2010 | Honda et al. | 348/311 |
| 2011/0025865 A1* | 2/2011 | Kunishige et al. | 348/220.1 |

* cited by examiner

*Primary Examiner* — Christopher Mahoney
*Assistant Examiner* — Linda B Smith
(74) *Attorney, Agent, or Firm* — Drinker Biddle & Reath LLP

(57) ABSTRACT

Provided are a digital photographing apparatus, a method of controlling the same, and a computer-readable medium for storing a program for executing the method. In the method of controlling a digital photographing apparatus, at least one target subject is determined from an input image. A target subject focus value of the at least one target subject is extracted while auto-focusing the at least one target subject. It is determined whether the target subject focus value stays within an in-focus range for a reference time or longer. The at least one target subject is auto-photographed when the target subject focus value is stays within the in-focus range for the reference time or longer.

24 Claims, 10 Drawing Sheets

FIG. 9

| USER | FILE NAME |
|---|---|
| A | 0001.jpg/0003.jpg/0010.jpg |
| B | 0002.jpg/0007.jpg |
| C | 0005.jpg/0006.jpg |

DIGITAL PHOTOGRAPHING APPARATUS, METHOD OF CONTROLLING THE SAME, AND A COMPUTER-READABLE MEDIUM STORING PROGRAM TO EXECUTE THE METHOD

CROSS-REFERENCE TO RELATED PATENT APPLICATION

This application claims the benefit of Korean Patent Application No. 10-2010-0010499, filed on Feb. 4, 2010, in the Korean Intellectual Property Office, the entire disclosure of which is incorporated herein by reference.

BACKGROUND

1. Field of the Invention

The invention relates to a digital photographing apparatus with auto-focusing, a method of auto-focusing the same, and a computer-readable medium storing a program to execute the method.

2. Description of the Related Art

Digital photographing apparatuses take photographs of subjects by converting light incident to the subjects into electrical signals using imaging devices. Many digital photographing apparatuses perform an auto-focusing operation to obtain a clearer image. If an image is out of focus, despite the auto-focusing performed by the digital photographing apparatus, the photographer may become frustrated and displeased with the digital photographing apparatus.

SUMMARY

Therefore, there is a need in the art for an apparatus, non-transitory computer program product, and method of controlling a digital photographing apparatus, the method including determining at least one target subject from an input image; extracting a target subject focus value of the at least one target subject while auto-focusing the at least one target subject; determining whether the target subject focus value stays within an in-focus range for a reference time or longer; and auto-photographing the at least one target subject when the target subject focus value stays within the in-focus range for the reference time or longer.

The method may further include tracing the at least one target subject.

The method may further include determining whether the at least one target subject comprises a front side of a face, and wherein the step of auto-photographing the at least one target subject further comprises: if it is determined that the at least one target subject comprises a front side of the face, then auto-photographing the at least one target subject when the target subject focus value stays within the in-focus range for the reference time or longer while the at least one target subject comprises the front side of the face.

Determining at least one target subject from an input image may include detecting at least one face from the input image; receiving a user input for selecting at least one face from the at least one detected face; and determining at least one target subject to be the selected at least one face.

The method may further include if the at least one target subject is plural, determining whether the target subject focus values of all of the at least one target subject stay within the in-focus range for the reference value or longer, and auto-photographing the at least one target subject when the target subject focus values of all of the at least one target subject stay within the in-focus range for the reference value or longer.

The method may further include if the at least one target subject is plural, determining priorities for the least one target subject, and determining whether a target subject focus value of a target subject having a first priority among the at least one target subject stays within the in-focus range for the reference value or longer, and auto-photographing the at least one target subject when the target subject focus value of the target subject having the first priority stays within the in-focus range for the reference value or longer, wherein the first priority is a highest priority among the determined priorities.

The method may further include capturing a moving image, wherein the input image comprises video frames, and the auto-photographing comprises capturing a still image when the target subject focus value stays within the in-focus range for the reference time or longer during the moving image capture.

The method may further include if the at least one target subject is a face, identifying the at least one target subject by recognizing the face from the at least one target subject; and classifying and storing a captured image according to identification information regarding the at least one target subject.

A digital photographing apparatus is disclosed. The digital photographing apparatus includes a target subject determination unit configured to determine at least one target subject from an input image; an auto-focusing unit configured to extract a target subject focus value of the at least one target subject while auto-focusing the at least one target subject; an in-focus determination unit configured to determine whether the target subject focus value stays within an in-focus range for a reference time or longer; and a photographing control unit configured to perform an auto-photographing when the target subject focus value stays within the in-focus range for the reference time or longer.

The digital photographing apparatus may further include a target subject tracing unit configured to trace the at least one target subject.

The digital photographing apparatus may further include a front-side determination unit configured to determine whether the at least one target subject comprises a front side of a face, and wherein the photographing control unit is further configured to perform the auto-photographing if the target subject focus value stays within the in-focus range for the reference time or longer while the at least one target subject comprises the front side of the face.

The digital photographing may further include a face detecting unit configured to detect at least one face from the input image; and a user input detecting unit configured to receive a user input indicating a selection of at least one face from the at least one detected face, wherein the target subject determination unit is further configured to determine the detected at least one face selected by the user as the at least one target subject.

The in-focus determination unit may further include to determine whether the target subject focus values of all of the at least one target subject stay within the in-focus range for the reference value or longer, if the at least one target subject is plural, and wherein the photographing control unit is further configured to perform the auto-photographing when the target subject focus values of all of the at least one target subject stay within the in-focus range for the reference value or longer, if the at least one target subject is plural.

The digital photographing apparatus may further include a priority determination unit configured to determine priority of the least one target subject, if the at least one target subject is plural, and wherein the in-focus determination unit is further configured to determine whether a target subject focus value of a target subject having a first priority among the at least one target subject stays within the in-focus range for the reference value or longer, and wherein the photographing control unit is further configured to perform the auto-photographing if the target subject focus value of the target subject having the first priority stays within the in-focus range for the reference value or longer.

The digital photographing apparatus may further include a moving image capturing unit configured to capture a moving image, wherein the input image comprises moving image frames, and the photographing control unit captures a still image when the target subject focus value stays within the in-focus range for the reference time or longer during the moving image capture.

The digital photographing apparatus may further include a face recognition unit for identifying the at least one target subject by recognizing the face from the at least one target subject; and a storage control unit for classifying and storing a captured image according to identification information regarding the at least one target subject.

The following is disclosed: a non-transitory computer program product, comprising a computer usable medium having a computer readable program code embodied therein, said computer readable program code adapted to be executed to implement a method of controlling a digital photographing apparatus.

The method may include determining at least one target subject from an input image; extracting a target subject focus value of the at least one target subject while auto-focusing the at least one target subject; determining whether the target subject focus value stays within an in-focus range for a reference time or longer; and auto-photographing the at least one target subject when the target subject focus value stays within the in-focus range for the reference time or longer.

The method may include tracing the at least one target subject.

The method may include determining whether the at least one target subject comprises a front side of a face, and wherein the step of auto-photographing the at least one target subject further comprises: if it is determined that the at least one target subject comprises a front side of the face, then auto-photographing the at least one target subject when the target subject focus value stays within the in-focus range for the reference time or longer while the at least one target subject comprises the front side of the face.

Determining at least one target subject from an input image may include detecting at least one face from the input image; receiving a user input for selecting at least one face from the at least one detected face; and determining at least one target subject to be the selected at least one face.

The method may further include if the at least one target subject is plural, determining whether the target subject focus values of all of the at least one target subject stay within the in-focus range for the reference value or longer, and auto-photographing the at least one target subject when the target subject focus values of all of the at least one target subject stay within the in-focus range for the reference value or longer.

The method may further include if the at least one target subject is plural, determining priorities for the least one target subject, and determining whether a target subject focus value of a target subject having a first priority among the at least one target subject stays within the in-focus range for the reference value or longer, and auto-photographing the at least one target subject when the target subject focus value of the target subject having the first priority stays within the in-focus range for the reference value or longer, wherein the first priority is a highest priority among the determined priorities.

The method may further include capturing a moving image, wherein the input image comprises video frames, and the auto-photographing comprises capturing a still image when the target subject focus value stays within the in-focus range for the reference time or longer during the moving image capture.

The method may further include if the at least one target subject is a face, identifying the at least one target subject by recognizing the face from the at least one target subject; and classifying and storing a captured image according to identification information regarding the at least one target subject.

BRIEF DESCRIPTION OF THE DRAWINGS

The above and other features and advantages of the invention will become more apparent by describing in detail exemplary embodiments thereof with reference to the attached drawings in which:

FIG. 9 illustrates a list of captured images according to identification information, according to an embodiment of the invention;

DETAILED DESCRIPTION OF THE INVENTION

Figure 1:
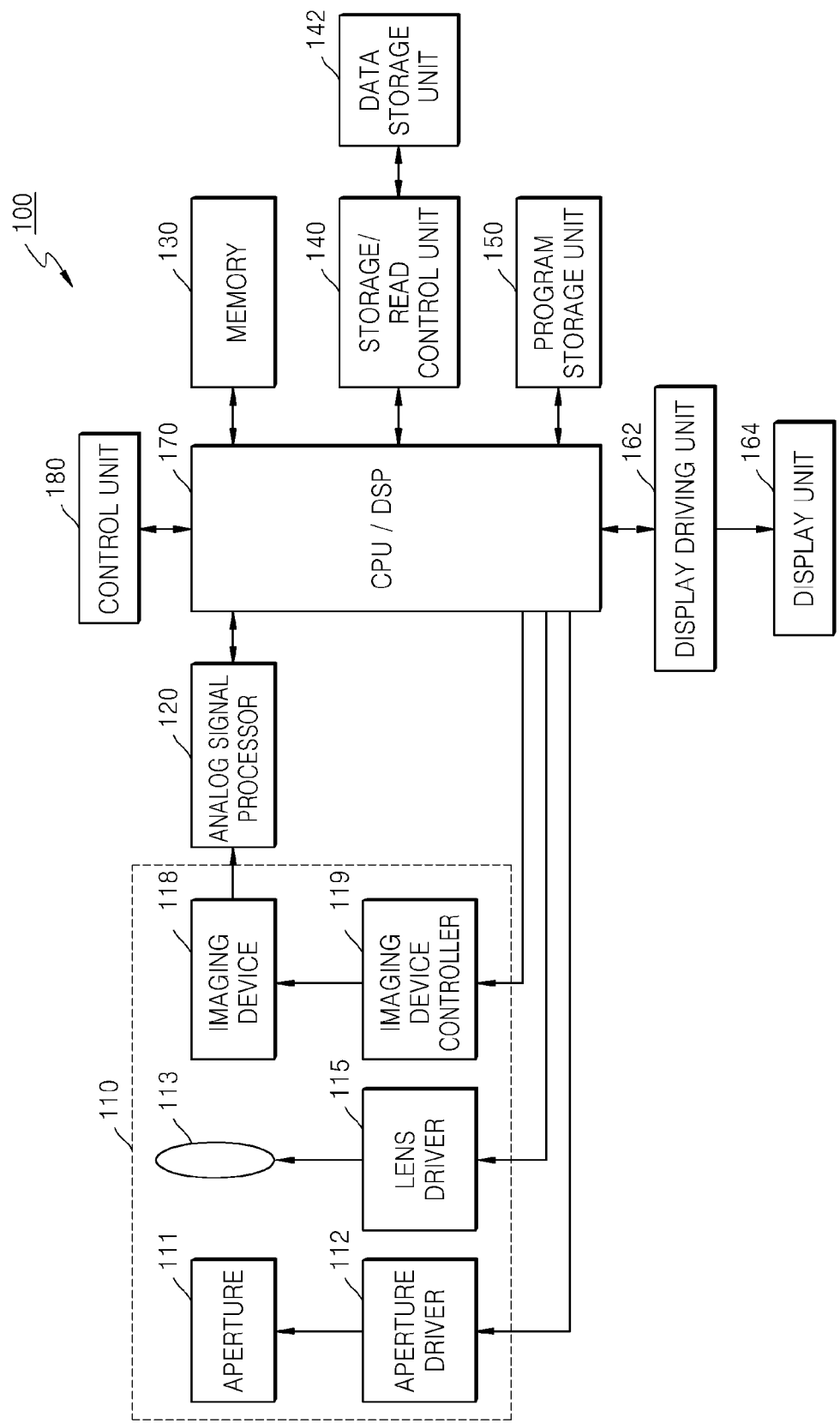
FIG. 1 is a diagram illustrating a digital photographing apparatus according to an embodiment of the invention.

The invention will now be described more fully with reference to the accompanying drawings, in which exemplary embodiments of the invention are shown. The invention may, however, be embodied in many different forms and should not be construed as being limited to the embodiments set forth herein; rather, these embodiments are provided so that this disclosure will be thorough and complete, and will fully convey the concept of the invention to those skilled in the art. Like reference numerals in the drawings denote like elements, and thus their description will be omitted.

FIG. 1 is a diagram illustrating a digital photographing apparatus 100 according to an embodiment of the invention.

Referring to FIG. 1, the digital photographing apparatus 100 according to the current embodiment of the invention includes a photographing unit 110, an analog signal processor 120, a memory 130, a storage/read control unit 140, a data storage unit 142, a program driving unit 150, a display driving unit 162, a display unit 164, a central processing unit (CPU)/ digital signal processor (DSP) 170, and a control unit 180.

The overall operations of the digital photographing apparatus 100 may be managed by the CPU/DSP 170. The CPU/ DSP 170 may provide control signals to an aperture driver 112, a lens driver 115, an imaging device controller 119, and the like, to control the operations thereof.

The photographing unit 110, which is a component for generating an image of electrical signals from an incident light, may include an aperture 111, the aperture driver 112, a lens 113, the lens driver 115, an imaging device 118, and the imaging device controller 119.

The aperture driver 112 may adjust the degree of opening of the aperture 111 to adjust the amount of light incident to the imaging device 118.

The lens 113 may include a plurality of lenses such as zoom lenses and focus lenses. The position of the lens 113 may be adjusted by the lens driver 115. The lens driver 115 may adjust the position of the lens 113 according to control signals provided from the CPU/DSP 170.

The optical signals transmitted through the aperture 111 and the lens 113 may image the subject on a light-receiving surface of the image device 118. The imaging device 118 may be a Charge-Couple Device (CCD) image sensor array or a Complementary Metal-Oxide Semiconductor (CMOS) image sensor array that converts optical signals into electrical image signals. The sensitivity of the imaging device 118 may be adjusted by the imaging device control unit 119. The imaging device control unit 119 may control the imaging device 118 according to the control signals that may be automatically generated by the electrical image signals or manually inputted by a user's manipulation.

The exposure time of the imaging device 118 may be adjusted by a shutter (not shown). The shutter (not shown) may include a mechanical shutter that may move a cover to adjust the amount of incident light and/or an electronic shutter that may be supplied with an electrical signal to control the exposure.

The analog signal processor 120 may perform reduction of noise, adjustment of gain, standardization of a waveform, and A/D conversion on supplied analog signals.

The signal converted by the analog signal processor 120 may be inputted to the CPU/DSP 170 through the memory 130 or directly to the CPU/DSP 170. Here, the memory 130 may serve as a main memory of the digital photographing apparatus 100, and may store necessary information during the operation of the CPU/DSP 170. The program storage unit 150 may store programs, such as an operating system and an application system, for driving the digital photographing apparatus 100.

Additionally, the digital photographing apparatus 100 may include the display unit 164 for displaying the operation state of the digital photographing apparatus 100 and information regarding images captured by the digital photographing apparatus 100. The display unit 164 may provide visual and/or auditory information to a user. For example, the display unit 164 may include a Liquid Crystal Display (LCD) and an Organic Light Emitting Diode (OLED) display to provide the visual information. The display unit 164 may include a touchscreen for recognizing touch inputs.

The display driving unit 162 may provide driving signals to the display unit 164.

The CPU/DSP 170 may process inputted image signals and control the respective components according to the inputted image signals or external input signals. The CPU/DSP 170 may reduce noise of the inputted image data, and may perform image signal processing, such as gamma correction, color filter array interpolation, color matrix, color correction, and color enhancement, for improving image quality. Also, the CPU/DSP 170 may generate an image file by compressing image data generated by the image signal processing for improving image quality, and may restore the image data from the image file. The compression format of the image may be a reversible format or an irreversible format. For example, in the case of a still image, the compression format may be the Joint Photographic Experts Group (JPEG) format or the JPEG 2000 format. On the other hand, in the case of a moving image capture, a video file may be generated by compressing a plurality of frames according to the Moving Picture Experts Group (MPEG) standards.

The image data outputted from the CPU/DSP 170 may be inputted to the storage/read control unit 140 directly or through the memory 130. The storage/read control unit 140 may store the image data in the data storage unit 142 according to a signal from a user or automatically. Also, the storage/ read control unit 140 may read the image data from the image file stored in the data storage unit 142, and input the image data to the display driver 162 through the memory 130 or other routes to display the image on the display unit 164. The data storage unit 142 may be removably or permanently installed in the digital photographing apparatus 100.

The CPU/DSP 170 may perform blurring, toning, sharpening, image analysis, image recognition, and image effects. The image recognition may include face recognition and scene recognition. Furthermore, the CPU/DSP 170 may perform a display image signal processing for displaying on the display unit 164. For example, the CPU/DSP 170 may perform luminance level adjustment, color correction, contrast adjustment, sharpening adjustment, screen segmentation, character image generation, and image synthesis. The CPU/ DSP 170 may be connected to an external monitor (not shown) to perform a certain image signal processing for displaying the image data on the external monitor. The CPU/ DSP 170 may send the processed image data to display a corresponding image on the external monitor.

The CPU/DSP 170 may execute programs stored in the program storage unit 150, or may include a separate module (not shown) to generate control signals for controlling auto focusing, zooming, focusing, and auto exposure correction to provide the control signals to the aperture driver 112, the lens driver 115, and the imaging device controller 119. The CPU/ DSP 170 may control overall operations of components, such as a shutter and a flash, provided in the digital photographing apparatus 100.

A user may input control signals through the control unit 180. The control unit 180 may include a shutter-release button for taking a photograph by exposing the imaging device 118 to light for a predetermined time, a power button for controlling the power-on/off, a wide-angle zoom button and a telescopic zoom button for widening or narrowing the angle of view, and various functional buttons such as white balance configuration selection, exposure selection, and selection modes such as text input mode, photographing mode, and replay mode. The control unit 180 may be configured with any physical transducer, such as buttons, a keyboard, a touchpad, a touchscreen, and a remote controller, by which a user can input the control signal.

Figure 2:
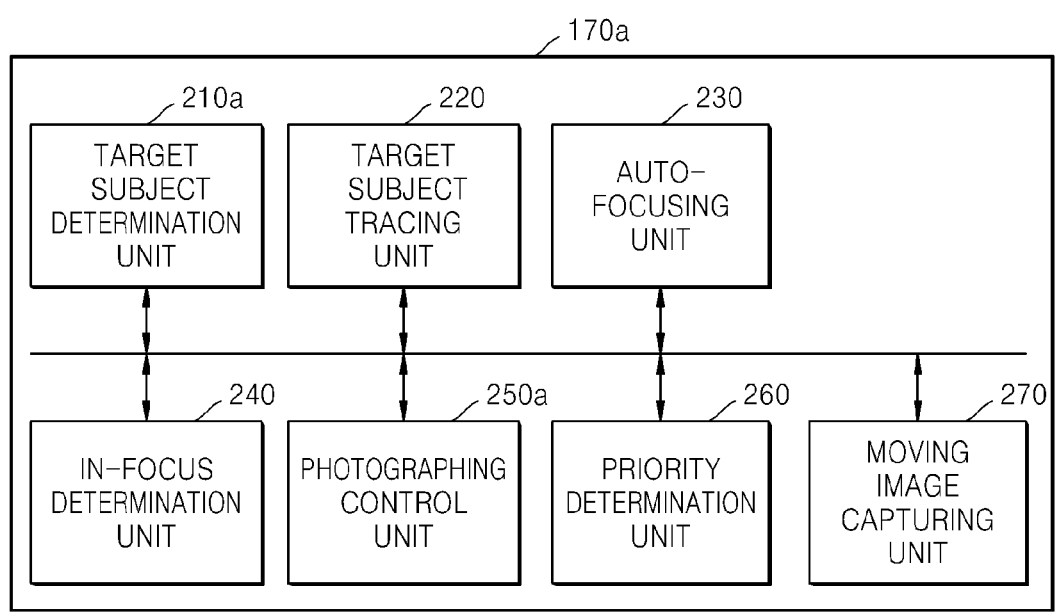
FIG. 2 is a diagram illustrating a structure of a central processing unit (CPU)/digital signal processor (DSP) according to an embodiment of the invention.

FIG. 2 is a diagram illustrating a structure of a CPU/DSP 170a according to an embodiment of the invention.

According to the current embodiment of the invention, when a target subject is focused, auto-photographing is performed. In this case, when there are at least two target subjects, the auto-photographing is performed after determining a method of auto-photographing the at least two target subjects. Also, during a moving image capture, a still image of the at least two target subjects may be captured. The CPU/DSP 170a according to the current embodiment may include a target subject determination unit 210a, a target subject tracing unit 220, an auto-focusing unit 230, an in-focus determination unit 240a, a photographing control unit 250a, a priority determination unit 260, and a moving image capturing unit 270.

The target subject determination unit 210a may determine at least one target subject from an input image. Here, the input image may be a live-view image. As another example, when the current embodiment is implemented during a moving image capture, the input image may be video frames. The target subject determination unit 210a may be configured to designate only one target subject. As another example, the target subject determination unit 210a may be configured to designate at least one target subject. The at least one target subject may be determined by a predetermined criterion, or may be determined by a user's selection. For example, the at least one target subject may be a face detected from the input image.

The target subject tracing unit 220 may trace at least one target subject from the input image. Since the input image is a live-view image or a video frame, the at least one target subject may move continuously, and the target subject tracing unit 220 may trace at least one moving target subject from the input image. For this, various object tracing methods may be used.

The auto-focusing unit 230 may perform an auto-focusing on the at least one target subject, and may extract a target subject focus value of the at least one target subject. For this, the auto focusing unit 230 may perform continuous auto-focusing. The target subject focus value is an indicator showing whether the subject is focused. When the target subject focus value is within a predetermined range, i.e., an in-focus range, the subject is regarded to be focused.

The in-focus determination unit 240 may determine whether the target subject focus value of the at least one target subject stays within the in-focus range for a reference time or longer. In the case of a continuously moving target subject such as a baby or a pet, the in-focus may be temporary. Accordingly, the auto-photographing may be performed only when the target subject focus value stays within the in-focus range for the reference time or longer. In this case, the reference time may be predetermined, or may be designated by a user. Also, the reference time may be determined according to the shutter speed. Since the exposure time of the imaging device 118 may vary with the shutter speed, a photograph may be taken without any shake by determining the reference time according to the shutter speed.

According to an embodiment of the invention, when there are at least two target subjects, the in-focus determination unit 240 may be configured to determine whether all of the target subjects are focused for the reference time or longer. In this case, all of the target subjects may be photographed without any shake.

As another example, when there are at least two target subjects, the priorities of the at least two target subjects may be determined. The in-focus determination unit 240 may be configured to determine whether the target subject focus value of the target subject having the first priority in the input image is within the in-focus range for the reference time or longer. For example, it will be assumed that there are the first subject, the second subject, and the third subject in the input image, and the priorities of the three subjects are determined in accordance with the above order. When the first subject is in the input image, the in-focus determination unit 240 may determine whether the target subject focus value of the first subject is within the in-focus range for the reference time or longer. Thereafter, when the first subject disappears, and only the second and third subjects are in the input image, the in-focus determination unit 240 may determine whether the target subject focus value of the second subject is within the in-focus range for the reference time or longer because the second subject has the first priority in the input image. For this configuration of the CPU/DSP 170a, the CPU/DSP 170a according to the current embodiment may further include a priority determination unit 260 for determining the priorities of a plurality of target subjects. For example, the predetermined criteria may include assigning a higher priority to a target subject that is closer to the center of the input image.

In the current embodiment, a user may select a first method of determining whether the target subject focus values of all the target subjects are within the in-focus range for the reference time or longer, or a second method of determining whether the target subject focus value of the target subject having the first priority is within the in-focus range for the reference time or longer.

When the target subject focus value of the at least one target subject stays within the in-focus range for the reference time or longer, the photographing control unit 250a may photograph a subject automatically even when there is no shutter-release input from a user. For example, in embodiments the photograph may be taken only when a user inputs a half-shutter (S1) signal. In embodiments, whether or not the photograph is automatically taken or not may be dependent on a mode configurable by a user. When the auto-photographing condition is satisfied, i.e., the target subject focus value of the at least one target subject stays within the in-focus range for the reference time or longer, the photographing control unit 250a may output a shutter-release signal to the photographing unit 110 to allow the photographing unit 110 to perform auto-photographing.

The current embodiment of the invention may be configured such that at least one target subject is captured as a still image during a moving image capture. For this, the CPU/DSP 170a according to the current embodiment may further include the moving image capturing unit 270. The moving image capturing unit 270 may record an input image as a video. In this case, the input image may be video frames. The moving image capturing unit 270 may perform an image processing on the video frames, and generate a video file by compressing the video frames based on the video compression standards such as MPEG.

Figure 3:
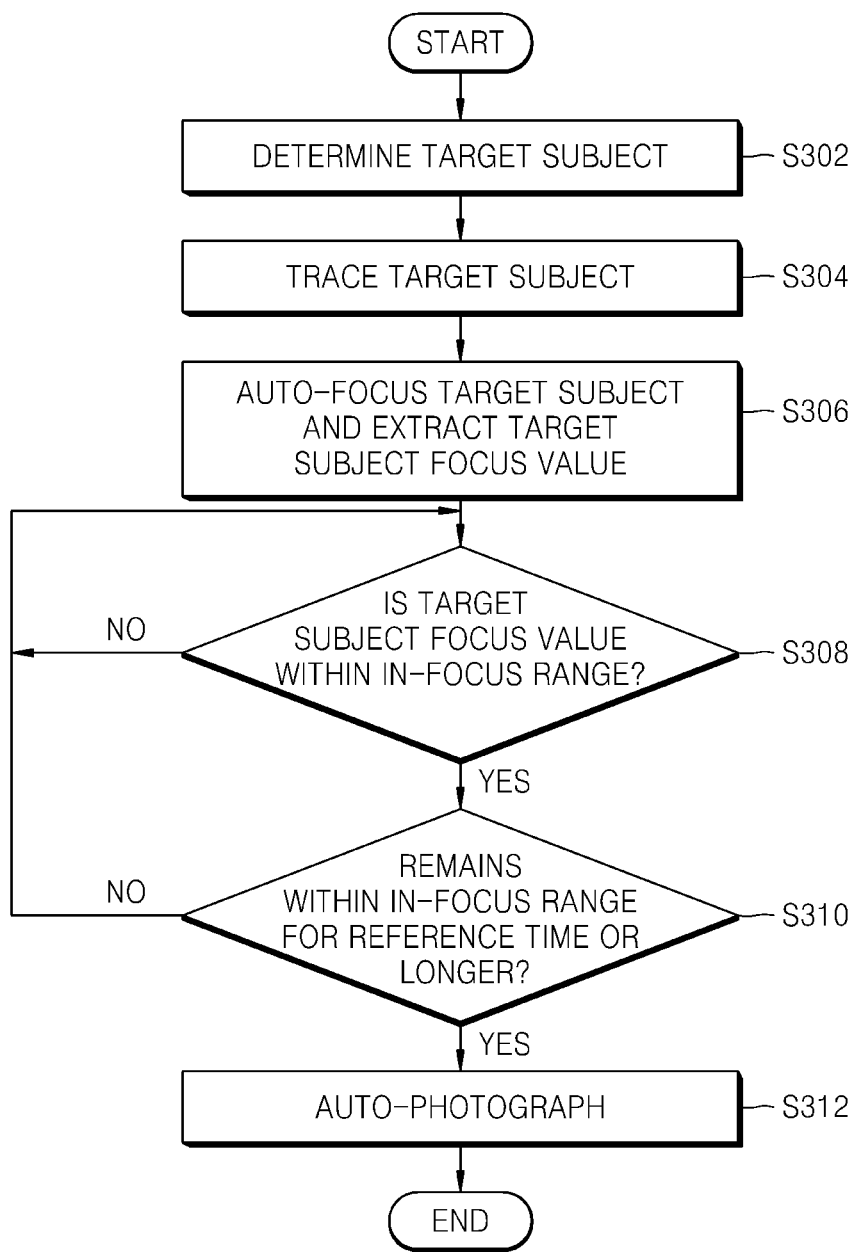
FIG. 3 is a flowchart illustrating a method of controlling a digital photographing apparatus, according to an embodiment of the invention.

FIG. 3 is a flowchart illustrating a method of controlling a digital photographing apparatus, according to an embodiment of the invention.

First, in operation S302, at least one target subject may be determined from an input image. As described above, the at least one target subject may be determined by a predetermined criterion or a user's selection.

In operation S304, the at least one target subject may be traced while the input image is being inputted. In operation S306, continuous auto-focusing may be performed on the at least one target subject, and a target subject focus value of the at least one target subject may be extracted.

In operation S308, it may be determined whether the target subject focus value of the at least one target subject is within an in-focus range. If the target subject focus value of the at least one target subject is within an in-focus range, in operation S310, it may be determined whether the target subject focus value of the at least one target subject is within an in-focus range for a reference time or longer. In embodiments, in operation S308, if it is determined that the target subject focus value of the at least one target subject is not within an in-focus range, the method may proceed to operation S306. In embodiments, in operation S310, if the target subject focus value of the at least one target subject is not within an in-focus range, the method may proceed to operation S302. If the target subject focus value of the at least one target subject is within an in-focus range for a reference time or longer, in operation S312, auto-photographing may be performed.

Figure 4:
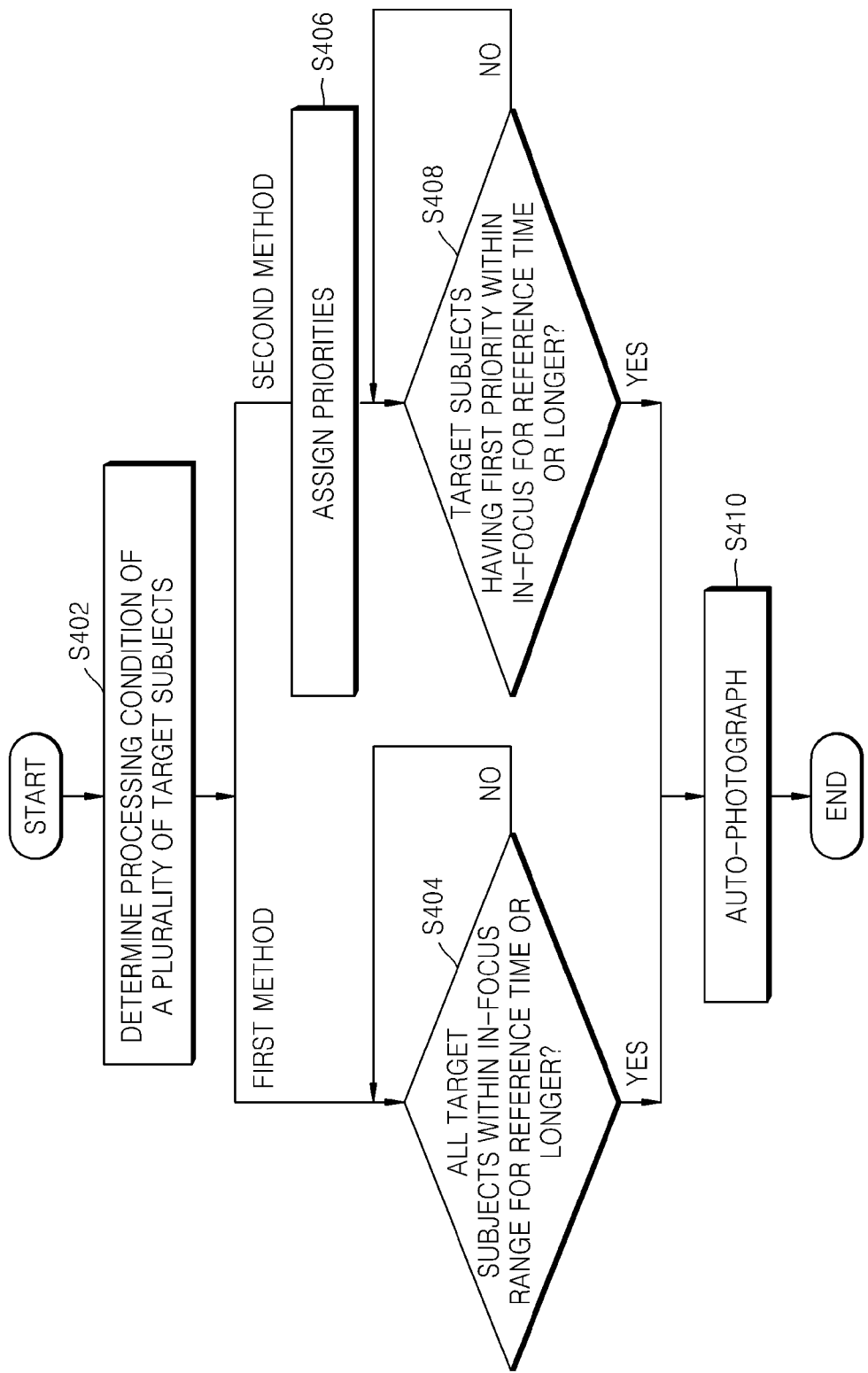
FIG. 4 is a flowchart illustrating a method of processing a plurality of target subjects, according to an embodiment of the invention.

FIG. 4 is a flowchart illustrating a method of processing a plurality of target subjects, according to an embodiment of the invention.

According to the current embodiment of the invention, when there are a plurality of target subjects, a method of controlling a digital photographing apparatus may be configured to determine whether all of the plurality of target subjects are focused for a reference time or longer. In this case, all of the plurality of target subjects may be photographed without any shake (first method).

As another example, when there are a plurality of target subjects, a method of controlling a digital photographing apparatus may be configured to assign priorities to the plurality of target subjects and determine whether the target subject focus value of the target subject having the first priority in an input image is within an in-focus range for the reference time or longer (second method).

Also, the current embodiment may be configured such that a user may select one of the first method and the second method. FIG. 4 illustrates that a user may select one of the first method and the second method.

In operation S402, it may be determined whether a condition of processing a plurality of target subjects complies with the first method or the second method. The condition of processing the plurality of target subjects may be determined according to a user's selection.

If the condition of processing the plurality of the target subjects complies with the first method, in operation S404, it may be determined whether the target subject focus values of all of the target subjects are within the in-focus range for the reference time or longer. If the target subject focus values of all of the target subjects are within the in-focus range for the reference time or longer, the method may proceed to operation S410 where auto-photographing may be performed. In embodiments, if the target subject focus values of all of the target subjects are not within the in-focus range for the reference time or longer, the method may return to operation S402.

Otherwise, if the condition of processing the plurality of the target subjects complies with the second method, in operation S406, the priorities may be assigned to the plurality of the target subjects. The priorities of the plurality of target subjects may be determined according to a user input. When the priorities are assigned to the plurality of target subjects, in operation S408, it may be determined whether the target subject focus value of the target subject having the first priority in the input image is within the in-focus range for the reference time or longer. If the target subject focus value of the target subject having the first priority in the input image is within the in-focus range for the reference time or longer, the method may proceed to operation S410 where auto-photographing may be formed. In embodiments, if the target subject focus value of the target subject having the first priority in the input image is not within the in-focus range for the reference time or longer, the method may return to operation S402.

Figure 5:
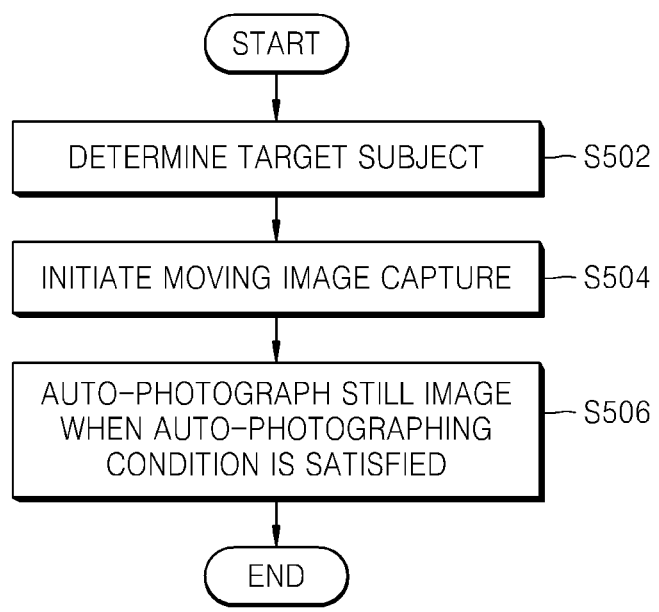
FIG. 5 is a flowchart illustrating a method of processing a subject during a moving image capture, according to an embodiment of the invention.

FIG. 5 is a flowchart illustrating a method of processing a subject during a moving image capture, according to an embodiment of the invention.

When the method of the current embodiment of the invention is performed during a moving image capture, a still image of a target subject may be captured during the moving image capture. For this, in operation S502, at least one target subject may be determined, and, in operation S504, a moving image capture may be initiated. A process of determining the at least one target subject may be performed in the live-view mode prior to the initiation of the moving image capture. As another example, the process of determining the at least one target subject may also be performed during the moving image capture.

When the target subject focus value of the at least one target subject is within the in-focus range for the reference time or longer during the moving image capture after the at least one target subject has been determined, in operation S506, auto-photographing may be performed to capture a still image of the at least one target subject. The still image captured during the moving image capture may be stored in association with the video file obtained by the moving image capture.

Figure 6:
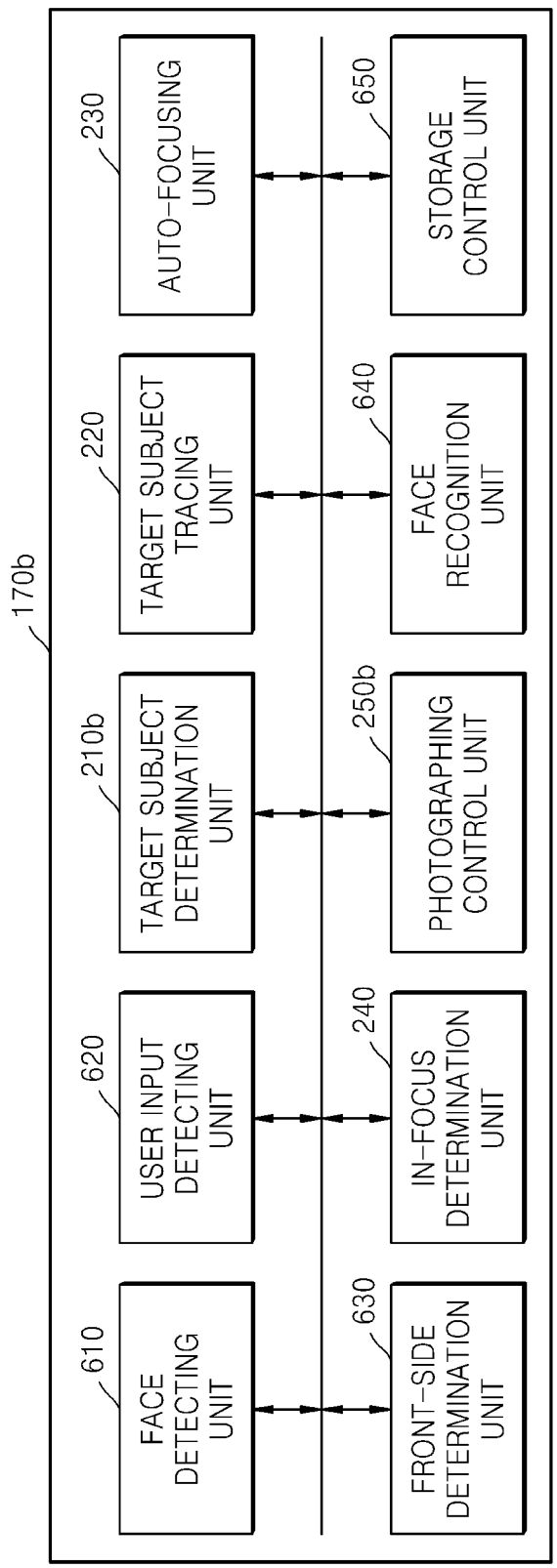
FIG. 6 is a diagram illustrating a structure of a CPU/DSP according to another embodiment of the invention.

FIG. 6 is a diagram illustrating a structure of a CPU/DSP 170b according to another embodiment of the invention.

According to another embodiment of the invention, at least one target subject may be a face. Auto-photographing may be performed only when the face faces the front side of the digital photographing apparatus 100. Also, captured images may be stored for each subject by object recognition. The CPU/DSP 170b according to the current embodiment may include a face detecting unit 610, a user input detecting unit 620, a target subject determination unit 210b, a target subject tracing unit 220, an auto-focusing unit 230, a front-side determination unit 630, an in-focus determination unit 240, a photographing control unit 250b, a face recognition unit 640, and a storage control unit 650.

Figure 7:
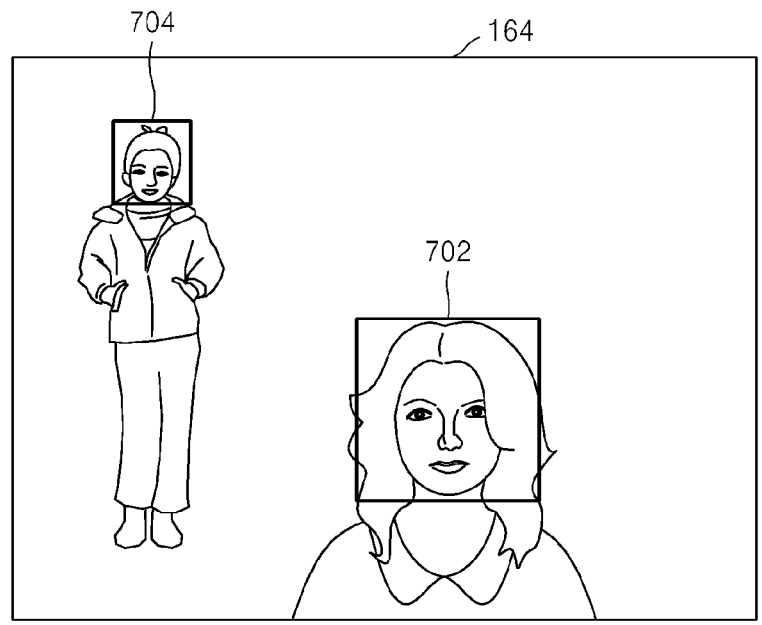
FIG. 7 is an image illustrating a face detected from an input image.
Figure 8:
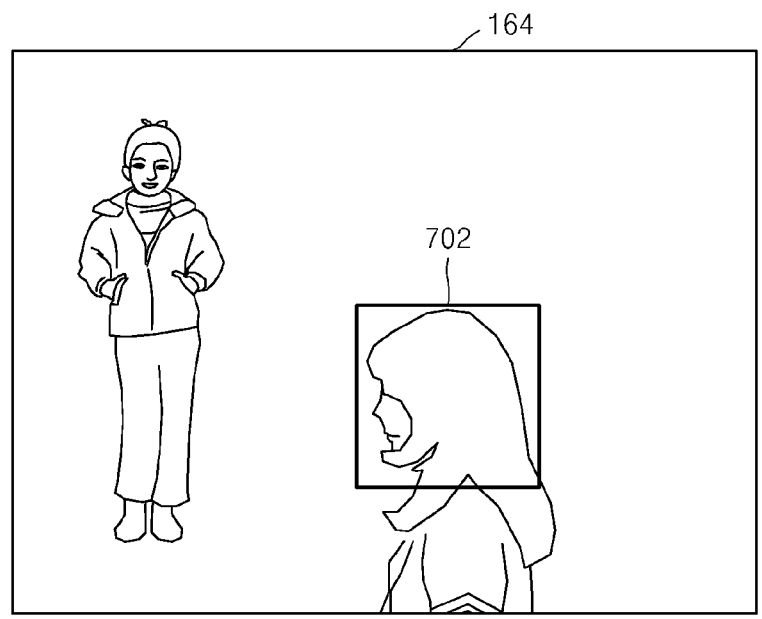
FIG. 8 is a diagram illustrating an exemplary appearance of a target subject detected from an input image.

The face detecting unit 610 may detect a face from an input image. For this, various methods may be used to detect the face; for example, an Adaboost method may be used. FIG. 7 is an image illustrating a face detected from an input image. As shown in FIG. 7, at least one face may be detected from the input image. The detected faces may be displayed in boxes 702 and 704.

The user input detecting unit 620 may receive a user input that selects a target subject from the faces detected by the face detecting unit 610. The user input may be inputted through the manipulation unit 180. Also, the user input may be an input through which a user designates a specific region of the input image directly as a target subject. In this case, a user may use a method such as region designation by using a touchscreen to designate the target subject.

The target subject determination unit 210b may determine at least one target subject. For example, when a first subject of the box 702 is designated as a target subject, the first subject of the box 702 may be determined as the target subject. As another example, the target subject determination unit 210b may determine at least one target subject automatically according to a predetermined criterion. For example, the target subject determination unit 210b may determine the target subject using criteria such as the face closest to the center of the image or the largest face.

The target subject tracing unit 220 may trace faces determined as the target subjects.

The auto-focusing unit 230 may perform continuous auto-focusing on the faces determined as the target subjects, and may extract target subject focus values.

The front-side determination unit 630 may determine whether the faces determined as the target subjects face the front side of the digital photographing apparatus 100. In the current embodiment, photographing may be performed only when the front sides of the faces face the digital photographing apparatus 100 to take a photograph of the target subjects without any shake. For example, the front-side determination unit 630 may determine that the target subject does not to face the front side of the digital photographing apparatus 100 when the profile of the face faces the digital photographing apparatus 100. The front-side determination unit 630 may determine whether or not the face of the target subject is a full face by using the characteristic data showing the characteristics of the full face, obtained by trainings.

The in-focus determination unit 240 may determine whether the target subject focus value of the at least one target subject is within an in-focus range for a reference time or longer.

The photographing control unit 250b may perform auto-photographing when the face of the target subject is a full face, and the target subject focus value is within the in-focus range for the reference time or longer. That is, the photographing control unit 250b according to the current embodiment may not perform the auto-photographing if the face of the target subject is not a full face even when the target subject focus value is within the in-focus range for the reference time or longer.

The face recognition unit 640 may recognize the face of the at least one target subject to identify the target subject. The face recognition unit 640 may perform face recognition by using previously recorded images of the user.

The storage control unit 650 may store a captured image for each user, using identification information produced by the face recognition of the face recognition unit 640. FIG. 9 illustrates a list of captured images according to identification information, according to an embodiment of the invention. As shown in FIG. 9, image files generated by the auto-photographing may be stored for each user.

Figure 10:
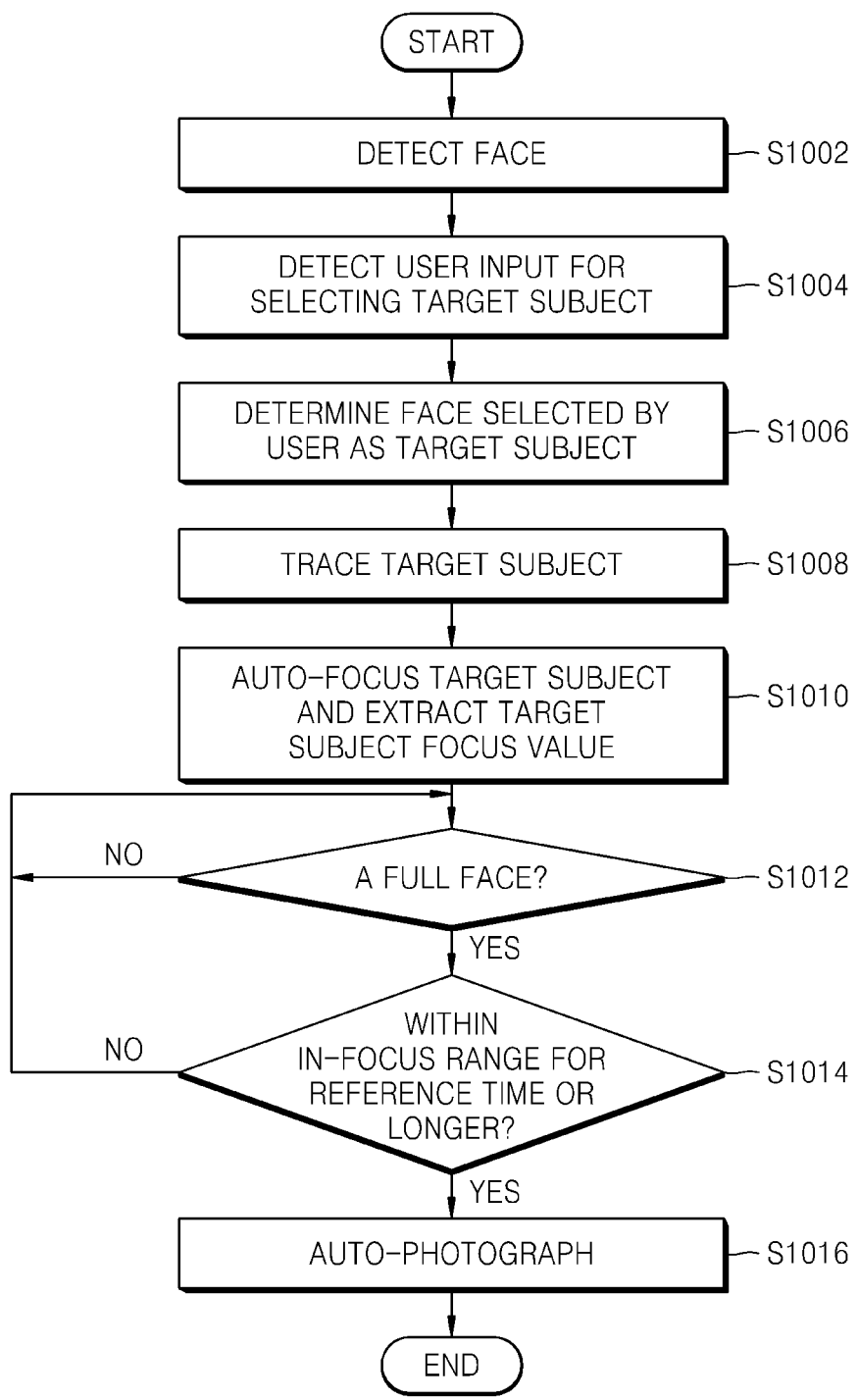
FIG. 10 is a flowchart illustrating a method of controlling a digital photographing apparatus, according to another embodiment of the invention.

FIG. 10 is a flowchart illustrating a method of controlling a digital photographing apparatus, according to another embodiment of the invention.

First, in operation S1002, faces may be detected from an input image. When the faces are detected, as shown in FIG. 7, boxes 702 and 704 indicating the detected faces may be displayed. A user may select at least one target subject from the detected faces. In operation S1004, if a user input for selecting the at least one target subject is detected, a face selected by the user may be determined as a target subject in operation S1006. When a target subject is determined, in operation S1008, the target subject may be traced. In operation S1010, continuous auto-focusing may be performed to extract a target subject focus value of the at least one target subject.

In operation S1012, it may be determined whether the face of the at least one target subject is a full face or the face side of a head. In operation S1014, it may be determined whether the target subject focus value of the at least one target subject is within an in-focus range for a reference time or longer. The sequence of the operation S1012 of determining whether the face of the at least one target subject is a full face and the operation S1014 of determining whether the target subject focus value of the at least one target subject is within an in-focus range for a reference time or longer may be repeatedly determined. When the at least one target subject is a full face, and the target subject focus value of the at least one target subject is within the in-focus range for the reference time or longer, the method may proceed to operation S1016 where auto-photographing may be performed. In embodiments, when the at least one target subject is not a full face, or the target subject focus value of the at least one target subject is not within the in-focus range for the reference time or longer, the method may return to operation S1002.

Figure 11:
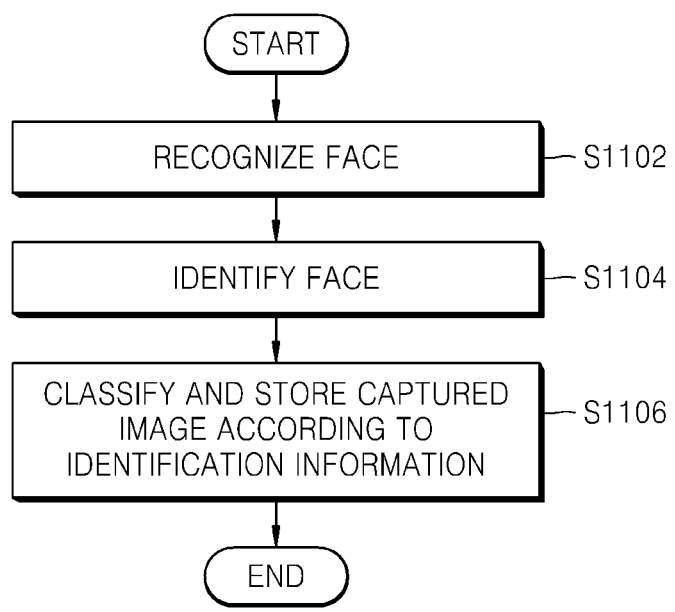
FIG. 11 is a flowchart illustrating a method of storing captured images, according to another embodiment of the invention.

FIG. 11 is a flowchart illustrating a method of storing captured images, according to another embodiment of the invention.

When auto-photographing is performed, in operation S1102, a face of at least one target subject may be recognized. In operation S1104, the face may be identified. In operation S1106, the captured images may be classified and stored according to the identification information. For this, the method of controlling a digital photographing apparatus, according to the current embodiment, may include photographing and storing a user's face to be classified and stored in advance.

According to the embodiments of the invention, a user can easily take a photograph of a focused moving subject because the moving subject is automatically photographed when focused.

The functionality associated with describing embodiments of the invention is described with a number of illustrative units. However, the units may be differently arranged so that the functionality of a single unit may be implemented with two or more units and the functionality of two or more units may be combined into a single unit. Moreover, the functionality may be differently arranged between the illustrative units.

The various illustrative units, logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, the steps and/or actions of a method or method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of instructions on a machine readable medium and/or computer readable medium.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A method of controlling a digital photographing apparatus, comprising:
    determining at least one target subject from an input image;
    extracting a target subject focus value of the at least one target subject while auto-focusing the at least one target subject;
    determining whether the target subject focus value stays within an in-focus range for a reference time or longer; and
    in response to a determination that the target subject focus value has stayed within an in-focus range for a reference time or longer, auto-photographing the at least one target subject.

2. The method of claim 1, further comprising tracing the at least one target subject.

3. The method of claim 1, wherein the method further comprises:
    determining whether the at least one target subject comprises a front side of a face, and
    wherein the step of auto-photographing the at least one target subject further comprises:
    if it is determined that the at least one target subject comprises a front side of the face, then auto-photographing the at least one target subject when the target subject focus value stays within the in-focus range for the reference time or longer while the at least one target subject comprises the front side of the face.

4. The method of claim 1, wherein determining at least one target subject from an input image, comprises:
    detecting at least one face from the input image;
    receiving a user input for selecting at least one face from the at least one detected face; and
    determining at least one target subject to be the selected at least one face.

5. The method of claim 1, further comprising:
    if the at least one target subject is plural, determining whether the target subject focus values of all of the at least one target subject stay within the in-focus range for the reference value or longer, and
    auto-photographing the at least one target subject when the target subject focus values of all of the at least one target subject stay within the in-focus range for the reference value or longer.

6. The method of claim 1, further comprising,
    if the at least one target subject is plural, determining priorities for the least one target subject, and
    determining whether a target subject focus value of a target subject having a first priority among the at least one target subject stays within the in-focus range for the reference value or longer, and
    auto-photographing the at least one target subject when the target subject focus value of the target subject having the first priority stays within the in-focus range for the reference value or longer, wherein the first priority is a highest priority among the determined priorities.

7. The method of claim 1, further comprising capturing a moving image, wherein the input image comprises video frames, and the auto-photographing comprises capturing a still image when the target subject focus value stays within the in-focus range for the reference time or longer during the moving image capture.

8. The method of claim 1, further comprising: if the at least one target subject is a face,
    identifying the at least one target subject by recognizing the face from the at least one target subject; and
    classifying and storing a captured image according to identification information regarding the at least one target subject.

9. A digital photographing apparatus comprising:
    a target subject determination unit configured to determine at least one target subject from an input image;
    an auto-focusing unit configured to extract a target subject focus value of the at least one target subject while auto-focusing the at least one target subject;
    an in-focus determination unit configured to determine whether the target subject focus value stays within an in-focus range for a reference time or longer; and
    a photographing control unit configured to perform an auto-photographing in response to a determination that the target subject focus value has stayed within an in-focus range for a reference time or longer.

10. The digital photographing apparatus of claim 9, further comprising a target subject tracing unit configured to trace the at least one target subject.

11. The digital photographing apparatus of claim 9, further comprising:
    a front-side determination unit configured to determine whether the at least one target subject comprises a front side of a face, and
    wherein the photographing control unit is further configured to perform the auto-photographing if the target subject focus value stays within the in-focus range for the reference time or longer while the at least one target subject comprises the front side of the face.

12. The digital photographing apparatus of claim 9, further comprising:
    a face detecting unit configured to detect at least one face from the input image; and
    a user input detecting unit configured to receive a user input indicating a selection of at least one face from the at least one detected face,
    wherein the target subject determination unit is further configured to determine the detected at least one face selected by the user as the at least one target subject.

13. The digital photographing apparatus of claim 9, wherein
    the in-focus determination unit is further configured to determine whether the target subject focus values of all of the at least one target subject stay within the in-focus range for the reference value or longer, if the at least one target subject is plural, and wherein the photographing control unit is further configured to perform the auto-photographing when the target subject focus values of all of the at least one target subject stay within the in-focus range for the reference value or longer, if the at least one target subject is plural.

14. The digital photographing apparatus of claim 9, further comprising:
- a priority determination unit configured to determine priority of the least one target subject, if the at least one target subject is plural, and wherein
- the in-focus determination unit is further configured to determine whether a target subject focus value of a target subject having a first priority among the at least one target subject stays within the in-focus range for the reference value or longer, and wherein
- the photographing control unit is further configured to perform the auto-photographing if the target subject focus value of the target subject having the first priority stays within the in-focus range for the reference value or longer, wherein the first priority is a highest priority among the determined priorities.

15. The digital photographing apparatus of claim 9, further comprising a moving image capturing unit configured to capture a moving image, wherein the input image comprises moving image frames, and the photographing control unit captures a still image when the target subject focus value stays within the in-focus range for the reference time or longer during the moving image capture.

16. The digital photographing apparatus of claim 9, further comprising:
- a face recognition unit for identifying the at least one target subject by recognizing a face from the at least one target subject; and
- a storage control unit for classifying and storing a captured image according to identification information regarding the at least one target subject.

17. A non-transitory computer program product, comprising a computer usable medium having a computer readable program code embodied therein, said computer readable program code adapted to be executed to implement a method of controlling a digital photographing apparatus, said method comprising:
- determining at least one target subject from an input image;
- extracting a target subject focus value of the at least one target subject while auto-focusing the at least one target subject;
- determining whether the target subject focus value stays within an in-focus range for a reference time or longer; and
- in response to a determination that the target subject focus value has stayed within an in-focus range for a reference time or longer, auto-photographing the at least one target subject.

18. The non-transitory computer program product of claim 17, wherein said method further comprises tracing the at least one target subject.

19. The non-transitory computer program product of claim 17, wherein said method further comprises:
- determining whether the at least one target subject comprises a front side of a face, and wherein the step of auto-photographing the at least one target subject further comprises:
- if it is determined that the at least one target subject comprises a front side of the face, then auto-photographing the at least one target subject when the target subject focus value stays within the in-focus range for the reference time or longer while the at least one target subject comprises the front side of the face.

20. The non-transitory computer program product of claim 17, wherein determining at least one target subject from an input image, comprises:
- detecting at least one face from the input image;
- receiving a user input for selecting at least one face from the at least one detected face; and
- determining at least one target subject to be the selected at least one face.

21. The non-transitory computer program product of claim 17, wherein the method further comprises:
- if the at least one target subject is plural, determining whether the target subject focus values of all of the at least one target subject stay within the in-focus range for the reference value or longer, and
- auto-photographing the at least one target subject when the target subject focus values of all of the at least one target subject stay within the in-focus range for the reference value or longer.

22. The non-transitory computer program product of claim 17, wherein the method further comprises:
- if the at least one target subject is plural, determining priorities for the least one target subject, and
- determining whether a target subject focus value of a target subject having a first priority among the at least one target subject stays within the in-focus range for the reference value or longer, and
- auto-photographing the at least one target subject when the target subject focus value of the target subject having the first priority stays within the in-focus range for the reference value or longer, wherein the first priority is a highest priority among the determined priorities.

23. The non-transitory computer program product of claim 17, wherein the method further comprises: capturing a moving image, wherein the input image comprises video frames, and the auto-photographing comprises capturing a still image when the target subject focus value stays within the in-focus range for the reference time or longer during the moving image capture.

24. The non-transitory computer program product of claim 17, wherein the method further comprises:
- if the at least one target subject is a face, identifying the at least one target subject by recognizing the face from the at least one target subject; and
- classifying and storing a captured image according to identification information regarding the at least one target subject.

* * * * *